United States Patent
Muthusamy et al.

(10) Patent No.: US 10,487,612 B2
(45) Date of Patent: Nov. 26, 2019

(54) GAS RESPONSIVE MATERIAL FOR SWELLABLE PACKERS

(71) Applicant: Halliburton Energy Services, Inc., Houston, TX (US)

(72) Inventors: Ramesh Muthusamy, Pune (IN); Anupom Sabhapondit, Pune (IN); Sandip Prabhakar Patil, Pune (IN); Rahul Chandrakant Patil, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 173 days.

(21) Appl. No.: 15/323,047

(22) PCT Filed: Aug. 4, 2014

(86) PCT No.: PCT/US2014/049613
§ 371 (c)(1),
(2) Date: Dec. 29, 2016

(87) PCT Pub. No.: WO2016/022093
PCT Pub. Date: Feb. 11, 2016

(65) Prior Publication Data
US 2017/0138149 A1    May 18, 2017

(51) Int. Cl.
*E21B 33/12* (2006.01)
*C08F 220/68* (2006.01)
*E21B 33/127* (2006.01)

(52) U.S. Cl.
CPC ........ *E21B 33/1208* (2013.01); *C08F 220/68* (2013.01); *E21B 33/127* (2013.01)

(58) Field of Classification Search
CPC .................................................. E21B 33/1208
See application file for complete search history.

(56) References Cited

U.S. PATENT DOCUMENTS

| 4,633,950 A * | 1/1987 | Delhommer ........... C09K 8/035 |
| | | 166/294 |
| 7,169,857 B2 | 1/2007 | McHugh et al. |
| 2008/0023205 A1* | 1/2008 | Craster ................... E21B 23/06 |
| | | 166/387 |
| 2008/0125335 A1 | 5/2008 | Bhaysar |
| 2011/0237468 A1 | 9/2011 | Reichenbach-Klinke et al. |
| 2012/0152630 A1 | 5/2012 | Sevre |

(Continued)

FOREIGN PATENT DOCUMENTS

CN    102348865 A    2/2012

OTHER PUBLICATIONS

Rindfleisch, Frank, Todd P. DiNoia, and Mark A. McHugh. "Solubility of polymers and copolymers in supercritical CO2." The Journal of Physical Chemistry 100.38 (1996): 15581-15587.

(Continued)

*Primary Examiner* — D. Andrews
(74) *Attorney, Agent, or Firm* — Scott Richardson; Baker Botts L.L.P.

(57) ABSTRACT

Swellable packer assemblies for providing a physical barrier inside a wellbore are provided. In one embodiment, the swellable packer comprises at least one seal element disposed on an outer surface of a tubular body portion which swells when contacted with one or more gases, the seal element comprising a polymer derived from a perfluoro vinyl monomer.

15 Claims, 4 Drawing Sheets

(56) References Cited

U.S. PATENT DOCUMENTS

2014/0110119 A1 4/2014 Luyster et al.
2016/0289532 A1 10/2016 Muthusamy et al.

OTHER PUBLICATIONS

Xu, Jianhang, and Robert M. Enick. "Thickening carbon dioxide with the fluoroacrylate-styrene copolymer." SPE Annual Technical Conference and Exhibition. Society of Petroleum Engineers, 2001.
McHugh, Mark A., et al. "Impact of fluorination and side-chain length on poly (methylpropenoxyalkylsiloxane) and poly (alkyl methacrylate) solubility in supercritical carbon dioxide." Macromolecules 35.17 (2002): 6479-6482.
Yoshida, Eri, and Akiko Mineyama. "Morphology control of poly [2-(perfluorooctyl) ethyl acrylate-co-tert-butyl acrylate] by pressure in supercritical carbon dioxide." Colloid and Polymer Science 290.2 (2012): 183-187.
Fahmy, Sherif Medhat. Solubility of Fluorinated Polymers in Supercritical Carbon Dioxide. Diss. 2005.
Yoshida, Eri, and Akito Nagakubo. "Superhydrophobic surfaces of microspheres obtained by self-assembly of poly [2-(perfluorooctyl) ethyl acrylate-ran-2-(dimethylamino) ethyl acrylate] in supercritical carbon dioxide." Colloid and Polymer Science 285.11 (2007): 1293-1297.
"Swell Technology Systems in Well Construction", Halliburton Brochure H0835, 2010, 2 pages.
International Preliminary Report on Patentability issued in related Application No. PCT/US2014/049613, dated Feb. 16, 2017 (12 pages).

* cited by examiner

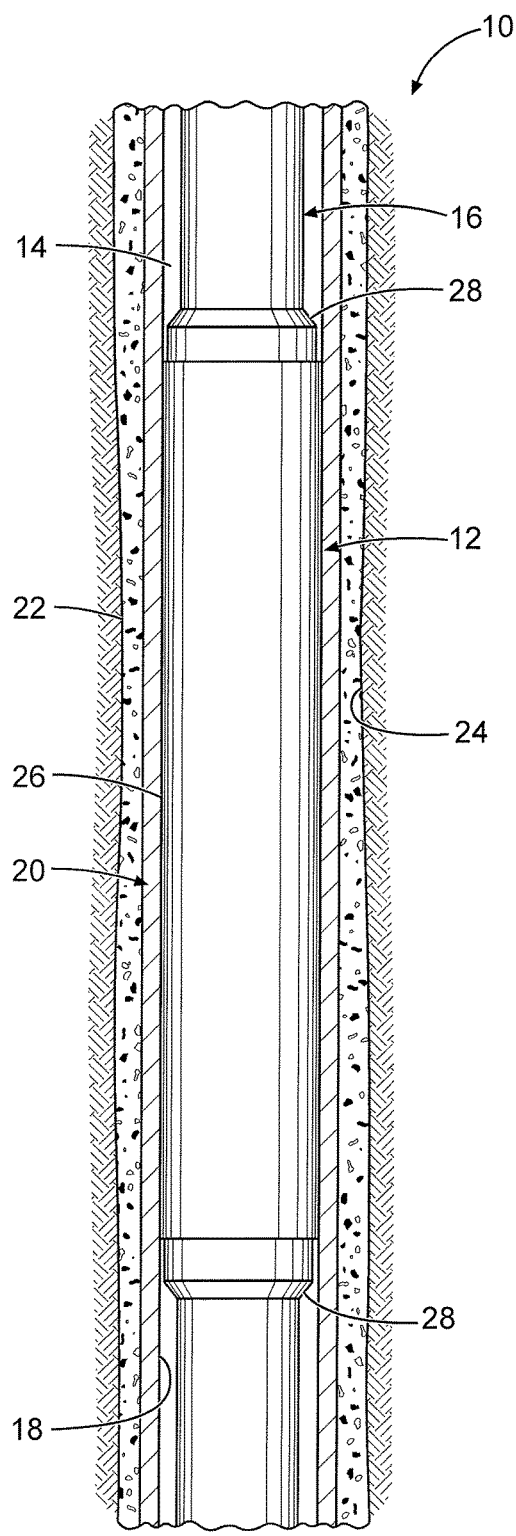
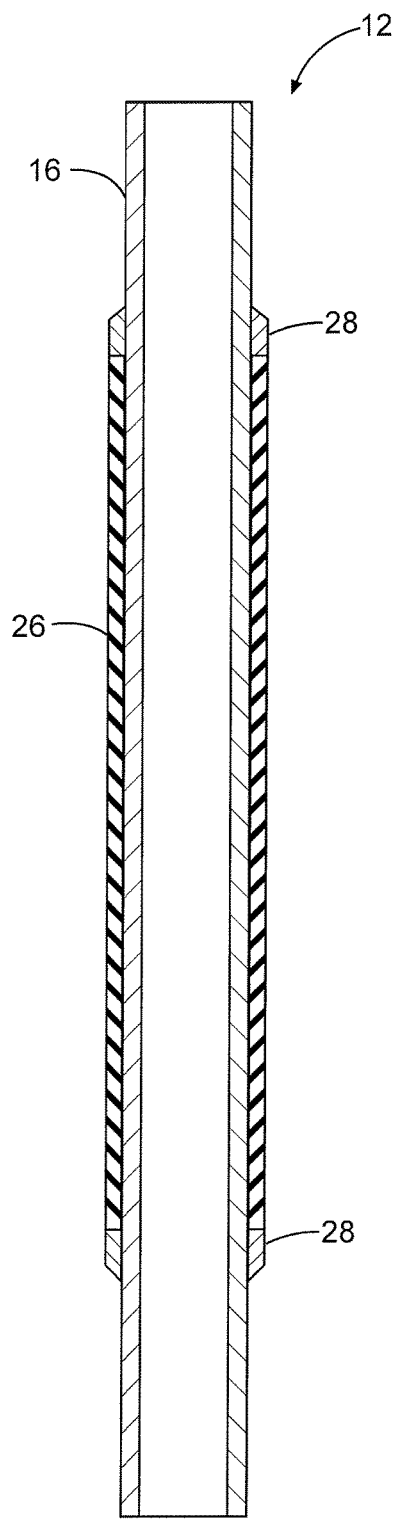
Fig. 1
Fig. 2

GAS RESPONSIVE MATERIAL FOR SWELLABLE PACKERS

CROSS-REFERENCE TO RELATED APPLICATION

The present application is a U.S. National Stage Application of International Application No. PCT/US2014/049613 filed Aug. 4, 2014, which is incorporated herein by reference in its entirety for all purposes.

BACKGROUND

The present disclosure relates to the use of swellable packers in subterranean wellbore operations and related industries.

It is well known that swellable packers can be used to create a physical barrier isolating different zones of an open wellbore from one another in the drilling process. The packer assembly may be introduced downhole in an unexpanded form, until positioned within the wellbore where isolation is needed. The packer may then be mechanically expanded or exposed to a fluid (e.g., water) to trigger the swelling of the packer's seal element. The swelling or expansion of the packer is designed to create a barrier between the downhole string and the inner casing or exposed wall of the wellbore. These barriers are generally able to withstand high temperatures and pressures, allowing for complete isolation of different zones of the well. In some instances a retrievable packer may be used wherein the packer is introduced downhole and used for completion of a job, but is then retrieved by retracting the seal element so that the packer can be retrieved from the wellbore.

BRIEF DESCRIPTION OF THE FIGURES

These drawings illustrate certain aspects of some of the embodiments of the present disclosure, and should not be used to limit or define the disclosure.

FIG. 1 shows a partially cross-sectional view of a well system embodying principles of the present disclosure.

FIG. 2 is an enlarged scale cross-sectional view of a packer assembly embodying principles of the disclosure.

Figure 3:
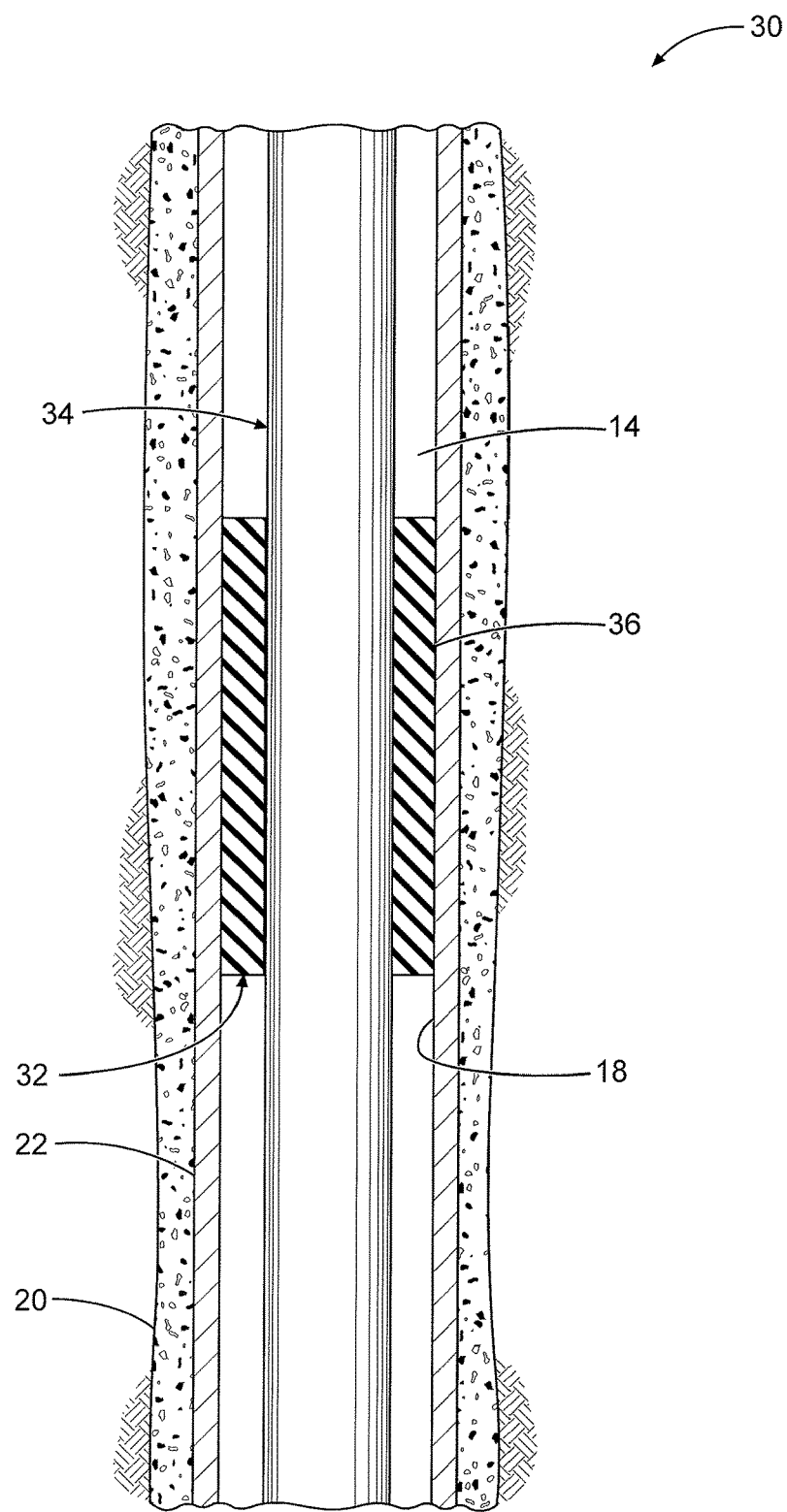
FIG. 3 shows a partially cross-sectional view of an alternate embodiment of the packer assembly.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates generally to subterranean wellbore operations. Specifically, the systems and methods of the present disclosure generally involve a swellable packer assembly for providing a physical barrier inside a wellbore. Furthermore, the present disclosure can be used to design retrievable packers. Conventional retrievable packers are activated by mechanical systems that can require difficult and complex tool design and arrangement to achieve the necessary expansion and contraction of the packer system. Using the present disclosure, retrievable swellable packers could be introduced into a wellbore and activated by exposing the seal element to one or more gases such as gaseous hydrocarbons (such as methane, ethane and natural gas, which are non-limiting examples), hydrogen sulfide, carbon dioxide, carbonic acid and/or hydrochloric acid. After completion of a job, the packer could be deactivated by removing the source of the gas, allowing the seal element to retract and be removed from the well. The swellable packer assembly of the present disclosure generally comprises a seal element disposed on a tubular for use with a downhole string. The seal element comprises a swellable polymer designed to swell when contacted with a gaseous hydrocarbons, carbon dioxide, and fluids comprising dissolved gases such as hydrochloric acid and carbonic acid. To facilitate a better understanding of the present disclosure, the following examples of certain embodiments are given. In no way should the following examples be read to limit, or define, the scope of the disclosure.

The terms "couple" or "couples," as used herein are intended to mean either an indirect or direct connection. Thus, if a first device couples to a second device, that connection may be through a direct connection, or through an indirect connection via other devices and connections. The term "uphole" as used herein means along the drillstring or the hole from the distal end towards the surface, and "downhole" as used herein means along the drillstring or the hole from the surface towards the distal end. However, the use of the terms "uphole" and "downhole" is not intended to limit the present disclosure to any particular wellbore configuration as the methods and systems disclosed herein may be used in conjunction with developing vertical wellbores, horizontal wellbore, deviated wellbores or any other desired wellbore configurations.

Generally, the polymers useful in embodiments of the packer assembly of the present disclosure comprise polymeric materials that swell in the presence of gaseous hydrocarbons (such as methane, ethane and natural gas, which are non-limiting examples), hydrogen sulfide, carbon dioxide, carbonic acid and/or hydrochloric acid. By "swell", "swelling", or "swellable" it is meant herein that the polymer increases its volume upon exposure to gaseous hydrocarbon, hydrogen sulfide, carbon dioxide, carbonic acid and/or hydrochloric acid, typically such that the resulting volume is greater than would be expected by mere linear addition of the polymer volume and the volume of gaseous hydrocarbon, hydrogen sulfide and/or carbon dioxide. In certain embodiments, the swelling can result in at least a 10% increase in the polymer volume and can result in at least a 13% increase, at least a 20% increase, or at least a 30% increase in the polymer volume. In certain embodiments, the swellable polymer at least swells upon exposure to carbon dioxide but can also swell upon exposure to hydrocarbons, hydrogen sulfide, carbonic acid and/or hydrochloric acid.

In certain embodiments, the swellable polymers used in the embodiments of the present disclosure comprise polymers that are swellable in the presence of a gas such as carbon dioxide at a temperature below 250° C. and at a pressure below 1000 bar. Generally, the polymers can be swellable in carbon dioxide at temperatures below 200° C., below 150° C. or below 100° C. and at a pressure below 700 bar, below 500 bar or below 100 bar. These temperatures and pressures are not intended to limit this disclosure as any range or combination of temperature and pressure may be appropriate to the extent that the polymer is still swellable as defined above.

In certain embodiments, the swellable polymers used in the embodiments of the present disclosure can be derived from a perfluoro vinyl monomer. Additionally, the polymer can be derived from at least one mono-vinyl monomer and at least one di-vinyl monomer. The mono-vinyl monomer can be selected from the group consisting of: alkyl acrylates, alkyl methacrylates, cyclohexyl acrylates, cyclohexyl methacrylates, aryl acrylates, aryl methacrylates, aminoalkyl acrylates, aminoalkyl methacrylates, perfluoroalkyl acrylates, perfluoroalkyl methacrylates, alkyl vinyl ethers, perfluoroalkyl vinyl ethers, styrene, acrylonitrile, 2-vinyl pyridine, 4-vinyl pyridine, acrylic acid, methacrylic acid, and vinyl acetate. The di-vinyl monomer can be selected from the group consisting of: alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, and allyl acrylate. More specifically, the swellable polymer can be a fluorinated acrylate polymer produced from 1H, 1H, 2H, 2H-Perfluorooctylacrylate and ethylenedimethacrylate monomers. Other types of vinyl monomers may be used to the extent that the resulting polymer is still swellable, as defined above.

The illustrative embodiment of FIG. 1 shows a well system 10 which embodies principles of the present disclosure. In the system 10, a packer assembly 12 is used to provide a fluid and pressure barrier in an annulus 14 formed between a tubular 16 and a wellbore interior surface 18. Although the surface 18 is depicted in FIG. 1 as being formed on an interior of a casing, liner or other type of tubular string 20 which is encased in cement 22, the surface 18 could instead be formed on an interior wall of a formation 24 (for example, in an uncased portion of the well), or could be any other surface in the well. The packer assembly 12 includes a seal element 26 which is outwardly extended in order to sealingly contact the surface 18. In this embodiment, the seal element 26 is disposed on the tubular 16.

In the illustrated example, the seal element 26 includes a swellable polymer which swells in response to contact with gaseous hydrocarbons, carbon dioxide, and fluids comprising dissolved gases. Further, in this embodiment, the seal element 26 is restricted from displacing longitudinally in the annulus 14 by means of end rings 28 positioned at opposite ends of the seal element 26.

Referring additionally now to FIG. 2, a schematic cross-sectional view of the packer assembly 12 is representatively illustrated apart from the remainder of the well system 10. In this embodiment of the packer assembly 12, the end rings 28 are coupled to a tubular 16. In the well system 10, the tubular 16 could be provided with suitable threaded end connections (not shown), and could be coupled as a part of a downhole string (not shown). The packer assembly 12 could alternatively be used in other well systems, without departing from the principles of the disclosure.

Referring now to FIG. 3, another embodiment of a well system 30 is shown. The packer assembly 32 is shown without longitudinally restrictive elements such as the end rings 28 (shown in FIG. 1). The packer assembly 32 is used to provide a fluid and pressure barrier in an annulus 14 formed between a tubular downhole string 34 and a wellbore interior surface 18. Although the surface 18 is depicted in FIG. 3 as being formed on an interior of a casing, liner or other type of tubular string 20 which is encased in cement 22, the surface 18 could instead be formed on an interior wall of a formation 24 (for example, in an uncased portion of the well), or could be any other surface in the well. The packer assembly 12 includes a seal element 26 which is outwardly extended in order to sealingly contact the surface 18. In this system 32, the seal element 36 is disposed directly on the tubular downhole string 34.

While the particular embodiments and examples of packer assemblies are described above, the swellable polymers of the present disclosure may be used in any type of packer assembly of any design known in the art. For example, these swellable polymers may be incorporated into packer assemblies having a pre-molded sealing element. In other embodiments, these swellable polymers may be incorporated into "slip-on" or bonded packer assemblies that may be installed on one or more strings in a wellbore. These embodiments are intended as examples only, as the swellable polymers may be modified and incorporated into any type of retrievable or permanent packer, including but not limited to tension packers, compression packers, and hydraulic-set single and dual string packers.

A method of operating the packer assembly is also provided. The method may include the steps of: providing a packer assembly comprising a tubular and at least one seal element disposed on the tubular which swells when contacted with a gas; positioning the packer assembly in at least a portion of a wellbore; exposing the seal element to a gas; and allowing the seal element to at least partially swell to contact the interior surface of a casing, liner or other type of tubular string which is encased in cement (the surface could instead be formed on an interior wall of a formation or could be any other surface in the well) and the exterior surface of the tubular. In one embodiment, the gaseous hydrocarbon, carbon dioxide, hydrogen sulfide, carbonic acid and/or hydrochloric acid, may be supplied from the surface using tubing, pumps, or other conveyance systems. In other embodiments, these substances may be naturally occurring in the well system. In other embodiments, gaseous hydrocarbons, carbon dioxide, hydrogen sulfide, carbonic acid and/or hydrochloric acid may be generated in situ in the wellbore, for example, via chemical reaction of one or more additives introduced into or naturally occurring in the wellbore. In certain embodiments, the method may further comprise retrieving the packer assembly by disabling the tubing, pumps, or other conveyance systems, thereby removing the gaseous hydrocarbon, carbon dioxide, hydrogen sulfide, carbonic acid and/or hydrochloric acid and allowing the seal element to at least partially retract such that the packer assembly can be retrieved from the wellbore to the surface. In other embodiments, the carbonic acid and/or hydrochloric acid removal may be facilitated by supplying an alkaline solution to neutralize the acid and accelerate the retraction of the seal element.

EXAMPLES

The following examples further illustrate the polymer used in this disclosure. Examples 1-4 illustrate polymer synthesis and Examples 5-7 illustrate the swelling of the resultant polymers according to certain embodiments of the present disclosure.

Example 1

Figure 4:
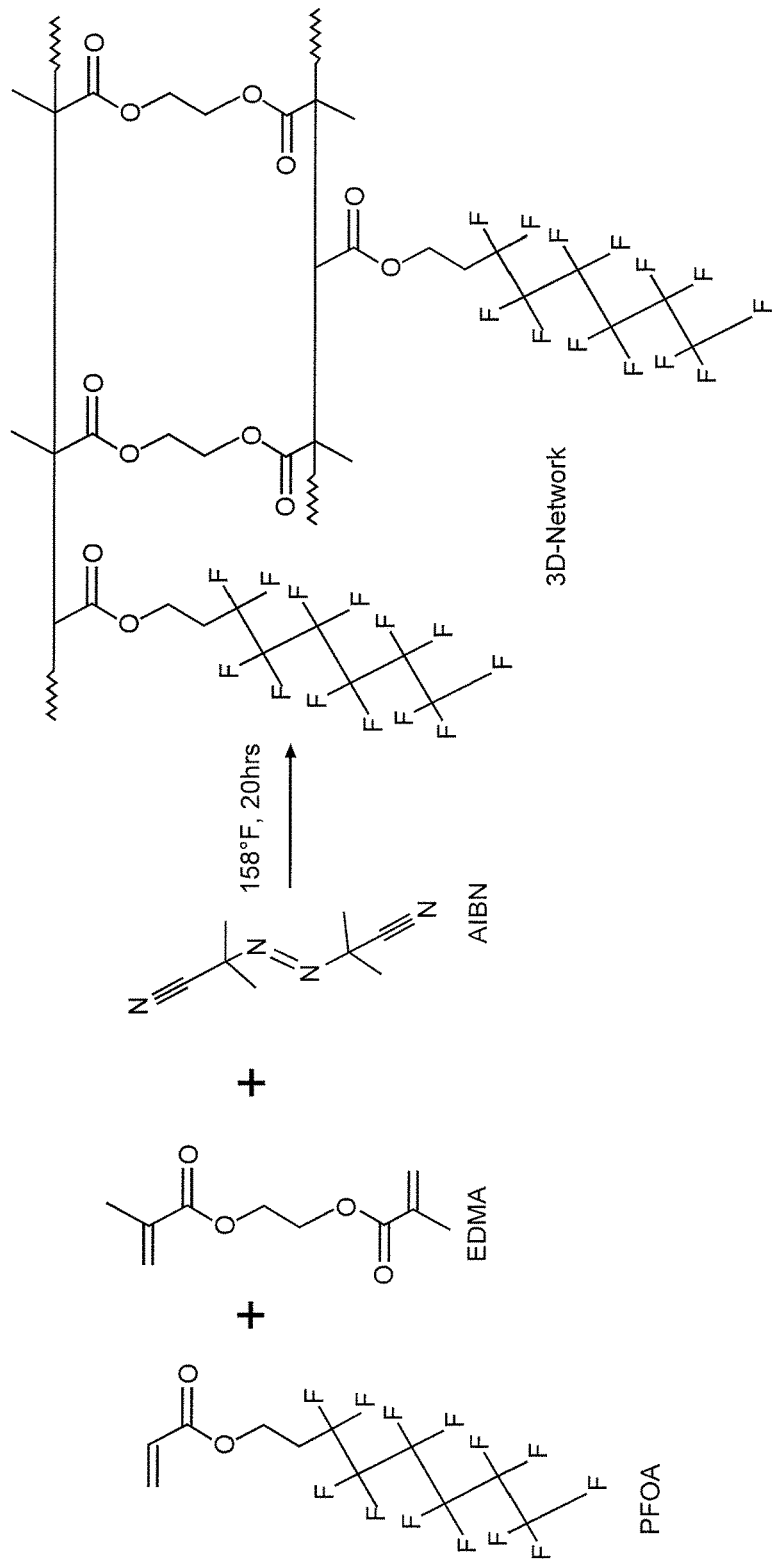
FIG. 4 is a schematic representation of polymer synthesis embodying principles of the present disclosure.

A polymer comprising 1H, 1H, 2H, 2H-perflurooctylacrylate (PFOA) monomer and ethylenedimethacrylate (EDMA) monomer was prepared as follows. PFOA (98 mole-%) and EDMA (2 mole-%) were mixed together in a glass tube and then azobisisobutyronitrile (AIBN) was dissolved in the mixture in an amount of 1 mole-% based on the total moles of PFOA and EDMA. AIBN was added as a free radical initiator. The mixture was then purged with nitrogen for 15 minutes and then sealed. The reaction was carried out at 158° F. (70° C.) for 20 hours. The resulting polymer was washed with methanol repeatedly and then dried at 50° C. for 24 hours. A schematic representation of this polymer synthesis is shown in FIG. 4.

Example 2

A polymer comprising 1H, 1H, 2H, 2H-perflurooctylacrylate (PFOA) monomer, dimethyl amino ethyl methacrylate (DMAEMA) monomer and ethylenedimethacrylate (EDMA) monomer was prepared as follows. PFOA (68 mole-%), DMAEMA (30 mole-%) and EDMA (2 mole-%) were mixed together in a glass tube and then azobisisobutyronitrile (AIBN) was dissolved in the mixture in an amount of 1 mole-% based on the total moles of PFOA, DMAEMA and EDMA. AIBN was added as a free radical initiator. The mixture was then purged with nitrogen for 15 minutes and then sealed. The reaction was carried out at 158° F. (70° C.) for 20 hours. The resulting polymer was washed with methanol repeatedly and then dried at 50° C. for 24 hours.

Example 3

A polymer comprising 1H, 1H, 2H, 2H-perflurooctylacrylate (PFOA) monomer, methyl methacrylate (MMA) monomer and ethylenedimethacrylate (EDMA) monomer was prepared as follows. PFOA (70 mole-%), MMA (28 mole-%) and EDMA (2 mole-%) were mixed together in a glass tube and then azobisisobutyronitrile (AIBN) was dissolved in the mixture in an amount of 1 mole-% based on the total moles of PFOA, MMA and EDMA. AIBN was added as a free radical initiator. The mixture was then purged with nitrogen for 15 minutes and then sealed. The reaction was carried out at 158° F. (70° C.) for 20 hours. The resulting polymer was washed with methanol repeatedly and then dried at 50° C. for 24 hours.

Example 4

A polymer comprising 1H, 1H, 2H, 2H-perflurooctylacrylate (PFOA) monomer, dimethyl amino ethyl methacrylate (DMAEMA) monomer, methyl methacrylate (MMA) monomer and ethylenedimethacrylate (EDMA) monomer was prepared as follows. PFOA (38 mole-%), DMAEMA (40 mole-%), MMA (20 mole-%) and EDMA (2 mole-%) were mixed together in a glass tube and then azobisisobutyronitrile (AIBN) was dissolved in the mixture in an amount of 1 mole-% based on the total moles of PFOA, DMAEMA, MMA and EDMA. AIBN was added as a free radical initiator. The mixture was then purged with nitrogen for 15 minutes and then sealed. The reaction was carried out at 158° F. (70° C.) for 20 hours. The resulting polymer was washed with methanol repeatedly and then dried at 50° C. for 24 hours.

Example 5

A polymer produced in accordance with Example 1 was placed in a measuring cylinder and then placed in a see-through autoclave to observe its swelling in the presence of carbon dioxide. The temperature in the autoclave was 75° F. (24° C.). After removing the air, carbon dioxide gas was applied and maintained at 700 psi (about 4826 kPa). The swelling of the polymer was observed within five minutes in the measuring cylinder. The polymer swelled noticeably. When the polymer was removed from the carbon dioxide environment, it returned to its original volume (de-swelling).

Example 6

A polymer produced in accordance with Example 2 was placed in a measuring cylinder and then placed in a see-through autoclave to observe its swelling in the presence of carbon dioxide. The polymer level in cylinder was about 22 ml. The temperature in the autoclave was 75° F. (24° C.). After removing the air, carbon dioxide gas was applied and maintained at 700 psi (about 4826 kPa). The swelling of the polymer was observed within five minutes in the measuring cylinder. The polymer swelled noticeably to about 25 ml in the cylinder.

Example 7

A polymer produced in accordance with Example 2 was placed in a measuring cylinder and then placed in a see-through autoclave. The polymer level in the cylinder was about 19 ml. The temperature in the autoclave was 75° F. (24° C.). After removing the air, carbonic acid was applied and maintained at 700 psi (about 4826 kPa). The swelling of the polymer was observed within five minutes in the measuring cylinder. The polymer swelled noticeably to about 28 ml in the cylinder.

One embodiment of the present disclosure is a swellable packer comprising: a substantially tubular body portion configured for incorporation in a tubular string; at least one seal element disposed on an outer surface of the tubular body portion which swells when contacted with one or more gases, the seal element comprising a polymer derived from a perfluoro vinyl monomer, the seal element having first and second axial ends; and first and second end rings disposed around the tubular body portion adjacent each of the first and second axial ends of the seal element. Optionally, the seal element is disposed around the tubular body portion. Optionally, the body portion is coupled directly to a downhole string for insertion into an open wellbore. Optionally, said polymer is derived from at least one mono-vinyl monomer and at least one di-vinyl monomer. Optionally, said mono-vinyl monomer comprises at least one compound selected from the group consisting of: an alkyl acrylate, an alkyl methacrylate, a cyclohexyl acrylate, a cyclohexyl methacrylate, an aryl acrylate, an aryl methacrylate, an aminoalkyl acrylate, an aminoalkyl methacrylate, a perfluoroalkyl acrylate, a perfluoroalkyl methacrylate, an alkyl vinyl ether, a perfluoroalkyl vinyl ether, styrene, acrylonitrile, 2-vinyl pyridine, 4-vinyl pyridine, acrylic acid, methacrylic acid, vinyl acetate, and any combination thereof. Optionally, said di-vinyl monomer comprises at least one compound selected from the group consisting of: an alkane diol diacrylate, an alkane diol dimethacrylate, an alkene glycol diacrylate, an alkene glycol dimethacrylate, an alkane diol divinyl ether, an alkene glycol divinylether, divinylbenzene, an allyl methacrylate, and an allyl acrylate.

Another embodiment of the present disclosure is a swellable packer comprising: a tubular member; at least one seal element disposed on the tubular member which swells when contacted with one or more gases, the seal element comprising a polymer derived from a perfluoro vinyl monomer. Optionally, the seal element is disposed around the tubular member. Optionally, the tubular member is disposed around a downhole string for positioning inside an open wellbore. Optionally, said polymer is derived from at least one mono-vinyl monomer and at least one di-vinyl monomer. Optionally, said mono-vinyl monomer comprises at least one compound selected from the group consisting of: an alkyl acrylate, an alkyl methacrylate, a cyclohexyl acrylate, a cyclohexyl methacrylate, an aryl acrylate, an aryl methacrylate, an aminoalkyl acrylate, an aminoalkyl methacrylate, a perfluoroalkyl acrylate, a perfluoroalkyl methacrylate, an alkyl vinyl ether, a perfluoroalkyl vinyl ether, styrene, acrylonitrile, 2-vinyl pyridine, 4-vinyl pyridine, acrylic acid, methacrylic acid, vinyl acetate, and any combination thereof. Optionally, said di-vinyl monomer comprises at least one compound selected from the group consisting of: an alkane diol diacrylate, an alkane diol dimethacrylate, an alkene glycol diacrylate, an alkene glycol dimethacrylate, an alkane diol divinyl ether, an alkene glycol divinylether, divinylbenzene, an allyl methacrylate, an allyl acrylate, and any combination thereof.

Figure 5:
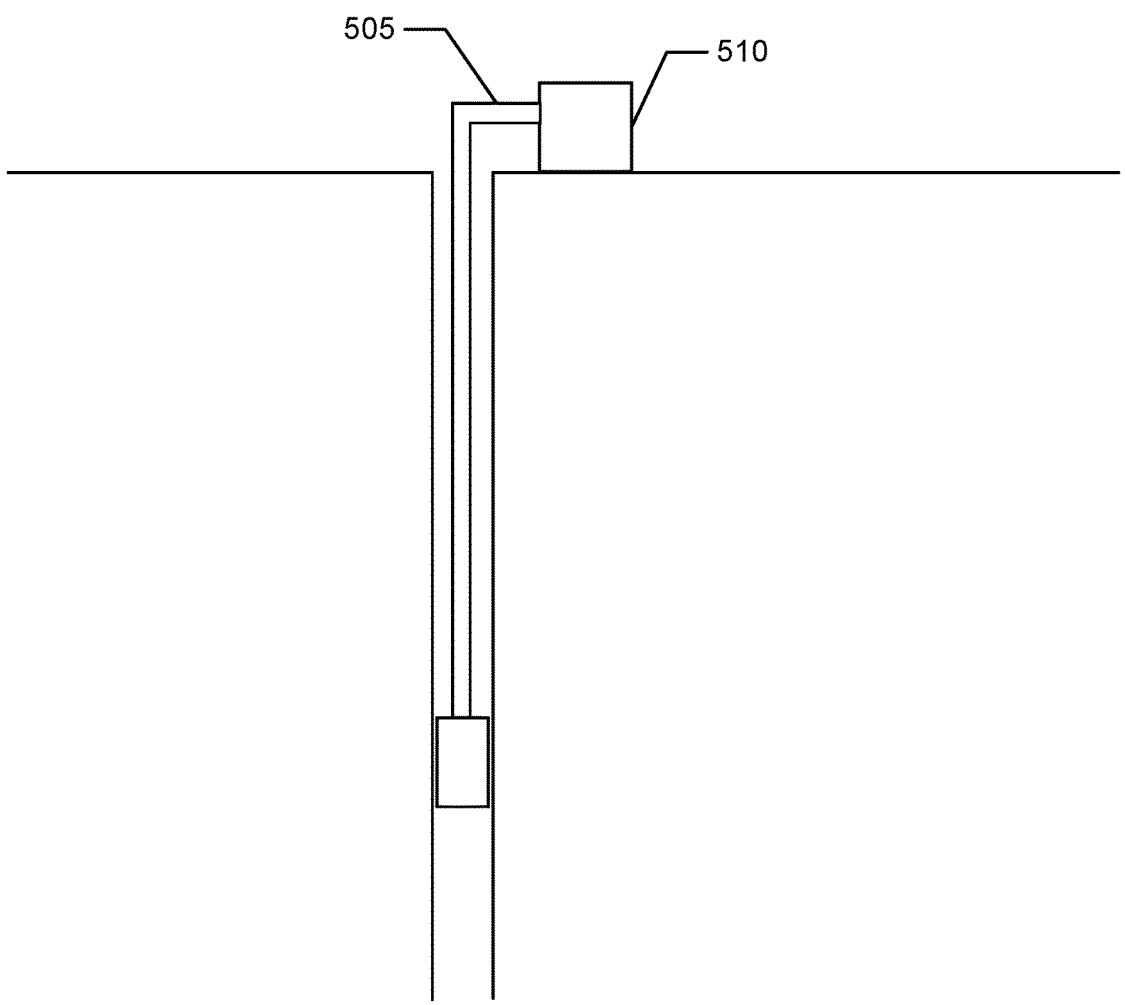
FIG. 5 is a piping system embodying principles of the present disclosure.

Another embodiment of the present disclosure is a method comprising: providing a packer assembly comprising a tubular member, and at least one seal element disposed on the tubular which swells when contacted with one or more gases; positioning the packer assembly in at least a portion of a wellbore; exposing the seal element to one or more gases; and allowing the seal element to at least partially swell to contact a portion of an interior surface of the wellbore and the exterior surface of the tubular. Optionally, the packer assembly is coupled to an instrument string for insertion into the wellbore. Optionally, the packer assembly is disposed around the downhole string for insertion into the wellbore. Optionally, the one or more gases comprise carbon dioxide. Optionally, as shown in FIG. 5, the carbon dioxide is introduced to the seal element upon being positioned in the desired portion of the wellbore using a piping mechanism 505 from a surface location 510. Optionally, the method further comprises disabling the piping system 505 from the surface location 510 to remove the source of carbon dioxide from the wellbore. Optionally, the method further comprises allowing the seal element to at least partially retract, breaking the contact with the interior surface of the wellbore. Optionally, the seal element further comprises first and second axial ends, and the packer assembly further comprises first and second end rings disposed around the tubular member adjacent each of the first and second axial ends of the seal element.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. No limitations are intended to the details of construction or design herein shown, other than as described in the claims below. Even though the figures depict embodiments of the present disclosure in a particular orientation, it should be understood by those skilled in the art that embodiments of the present disclosure are well suited for use in a variety of orientations. Accordingly, it should be understood by those skilled in the art that the use of directional terms such as above, below, upper, lower, upward, downward and the like are used in relation to the illustrative embodiments as they are depicted in the figures, the upward direction being toward the top of the corresponding figure and the downward direction being toward the bottom of the corresponding figure. While systems and methods are described in terms of "comprising," "containing," or "including" various components or steps, the systems and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A swellable packer comprising:
   a substantially tubular body portion configured for incorporation in a tubular string;
   at least one seal element disposed on an outer surface of the tubular body portion which swells when contacted with a carbonic acid, the at least one seal element comprising a polymer derived from a perfluoro vinyl monomer, the at least one seal element having first and second axial ends, and wherein the polymer comprises at least a mono-vinyl monomer and a di-vinyl monomer;
   first and second end rings disposed around the tubular body portion adjacent each of the first and second axial ends of the at least one seal element; and
   a piping mechanism to introduce the carbonic acid from a surface location.

2. The packer of claim 1 wherein:
   the at least one seal element is disposed around the tubular body portion.

3. The packer of claim 1 wherein:
   the body portion is coupled directly to a downhole string for insertion into an open wellbore.

4. The packer of claim 1 wherein:
   said mono-vinyl monomer comprises at least one compound selected from the group consisting of: an alkyl acrylate, an alkyl methacrylate, a cyclohexyl acrylate, a cyclohexyl methacrylate, an aryl acrylate, an aryl methacrylate, an aminoalkyl acrylate, an aminoalkyl methacrylate, a perfluoroalkyl acrylate, a perfluoroalkyl methacrylate, an alkyl vinyl ether, a perfluoroalkyl vinyl ether, styrene, acrylonitrile, 2-vinyl pyridine, 4-vinyl pyridine, acrylic acid, methacrylic acid, vinyl acetate, and any combination thereof.

5. The packer of claim 1 wherein
said di-vinyl monomer comprises at least one compound selected from the group consisting of: an alkane diol diacrylate, an alkane diol dimethacrylate, an alkene glycol diacrylate, an alkene glycol dimethacrylate, an alkane diol divinyl ether, an alkene glycol divinylether, divinylbenzene, an allyl methacrylate, and an allyl acrylate.

6. A swellable packer comprising:
a tubular member;
at least one seal element disposed on the tubular member which swells when contacted with a carbonic acid, the at least one seal element comprising a polymer derived from a perfluoro vinyl monomer, and wherein the polymer comprises at least a mono-vinyl monomer and a di-vinylmonomer; and
a piping mechanism to introduce the carbonic acid from a surface location.

7. The packer of claim 6 wherein:
the at least one seal element is disposed around the tubular member.

8. The packer of claim 6 wherein:
the tubular member is coupled to a downhole string for positioning inside an open wellbore.

9. The packer of claim 6 wherein:
said mono-vinyl monomer comprises at least one compound selected from the group consisting of: an alkyl acrylate, an alkyl methacrylate, a cyclohexyl acrylate, a cyclohexyl methacrylate, an aryl acrylate, an aryl methacrylate, an aminoalkyl acrylate, an aminoalkyl methacrylate, a perfluoroalkyl acrylate, a perfluoroalkyl methacrylate, an alkyl vinyl ether, a perfluoroalkyl vinyl ether, styrene, acrylonitrile, 2-vinyl pyridine, 4-vinyl pyridine, acrylic acid, methacrylic acid, vinyl acetate, and any combination thereof.

10. The packer of claim 6 wherein:
said di-vinyl monomer comprises at least one compound selected from the group consisting of: an alkane diol diacrylate, an alkane diol dimethacrylate, an alkene glycol diacrylate, an alkene glycol dimethacrylate, an alkane diol divinyl ether, an alkene glycol divinlyether, divinylbenzene, an allyl methacrylate, an allyl acrylate, and any combination thereof.

11. A method comprising:
providing a packer assembly comprising:
a tubular member; and
at least one seal element disposed on the tubular member which swells when contacted with a carbonic acid, wherein the at least one seal element comprises at least a mono-vinyl monomer and a di-vinyl monomer;
positioning the packer assembly in at least a portion of a wellbore;
exposing the at least one seal element to the carbonic acid; and
allowing the at least one seal element to at least partially swell to contact a portion of an interior surface of the wellbore and the exterior surface of the tubular; wherein
the carbonic acid introduced to the at least one seal element upon being positioned in the desired portion of the wellbore using a piping mechanism from a surface location.

12. The method of claim 11 wherein:
the packer assembly is coupled to an instrument string for insertion into the wellbore.

13. The method of claim 11 wherein:
the packer assembly is coupled to a downhole string for insertion into the wellbore.

14. The method of claim 11 further comprising:
allowing the at least one seal element to at least partially retract, breaking the contact with the interior surface of the wellbore.

15. The method of claim 11 wherein the at least one seal element further comprises first and second axial ends, and the packer assembly further comprises first and second end rings disposed around the tubular member adjacent each of the first and second axial ends of the at least one seal element.

* * * * *